United States Patent
Sampathkumaran et al.

(10) Patent No.: US 9,032,510 B2
(45) Date of Patent: *May 12, 2015

(54) GESTURE- AND EXPRESSION-BASED AUTHENTICATION

(75) Inventors: Sriram Sampathkumaran, San Diego, CA (US); Eric Yam, San Diego, CA (US); Helmut Neumann, Urbandale, IA (US); Seungwook Hong, San Diego, CA (US)

(73) Assignee: Sony Corporation, Tokyo (JP)

( * ) Notice: Subject to any disclaimer, the term of this patent is extended or adjusted under 35 U.S.C. 154(b) by 130 days.

This patent is subject to a terminal disclaimer.

(21) Appl. No.: 13/609,510

(22) Filed: Sep. 11, 2012

(65) Prior Publication Data

US 2014/0075548 A1 Mar. 13, 2014

(51) Int. Cl.
G06F 12/14 (2006.01)
H04L 9/32 (2006.01)
H04L 29/06 (2006.01)

(52) U.S. Cl.
CPC .......... *H04L 9/3234* (2013.01); *H04L 63/0861* (2013.01)

(58) Field of Classification Search
CPC . H04L 9/0866; H04L 9/3234; H04L 63/0861; H04N 21/4415; H04N 1/442; G06F 21/32
USPC ..................... 726/19; 713/186, 176; 382/103, 382/115–119
See application file for complete search history.

(56) References Cited

U.S. PATENT DOCUMENTS

| | | | |
|---|---|---|---|
| 6,389,542 B1 | 5/2002 | Flyntz | |
| 7,925,887 B2 | 4/2011 | Burton | |
| 7,929,733 B1 | 4/2011 | Lehnert et al. | |
| 2001/0049785 A1 | 12/2001 | Kawan et al. | |
| 2002/0184538 A1* | 12/2002 | Sugimura et al. | ............. 713/202 |
| 2004/0228507 A1 | 11/2004 | Es | |
| 2008/0001703 A1 | 1/2008 | Goto | |
| 2008/0098460 A1 | 4/2008 | Jain | |
| 2008/0126260 A1 | 5/2008 | Cox et al. | |
| 2008/0252414 A1 | 10/2008 | Crigger et al. | |
| 2009/0193514 A1 | 7/2009 | Adams et al. | |
| 2010/0138666 A1 | 6/2010 | Adams et al. | |
| 2010/0169659 A1 | 7/2010 | Shnowske et al. | |

(Continued)

FOREIGN PATENT DOCUMENTS

| | | |
|---|---|---|
| EP | 1818855 | 8/2007 |
| JP | 2004046697 | 2/2004 |

(Continued)

OTHER PUBLICATIONS

Sebastien Marcel, Johnny Mariethoz, Yann Rodriguez, Fabien Cardinaux; "Bi-Modal Face and Speech Authentication: A BioLogin Demonstration System", proceedings of the Second Workshop on Multimodal User Authentication, Mar. 2006. http://ftp.idiap.ch/pub/papers/2006/marcel-mmua-2006.pdf.

*Primary Examiner* — Thanhnga B Truong

(74) *Attorney, Agent, or Firm* — John L. Rogitz

(57) ABSTRACT

A user can define a gesture-based input mode with respective input value to establish an authentication protocol to unlock a computer or govern other computer behavior. As an alternative or in addition, the user can define a second input mode based on face recognition plus IR sensing satisfying a threshold to ensure a live person is being imaged for authentication, and/or face recognition plus a particular facial expression such as a smile and wink.

7 Claims, 3 Drawing Sheets

(56) References Cited

U.S. PATENT DOCUMENTS

| | | |
|---|---|---|
| 2010/0199323 A1 | 8/2010 | Salyards et al. |
| 2010/0251359 A1 | 9/2010 | Shirai et al. |
| 2011/0047608 A1 | 2/2011 | Levenberg |
| 2013/0004016 A1* | 1/2013 | Karakotsios et al. ......... 382/103 |

FOREIGN PATENT DOCUMENTS

| | | |
|---|---|---|
| JP | 2007233787 | 9/2007 |
| JP | 2012109976 | 6/2012 |
| KR | 20120014012 | 2/2012 |
| WO | 2009152338 | 12/2009 |

* cited by examiner

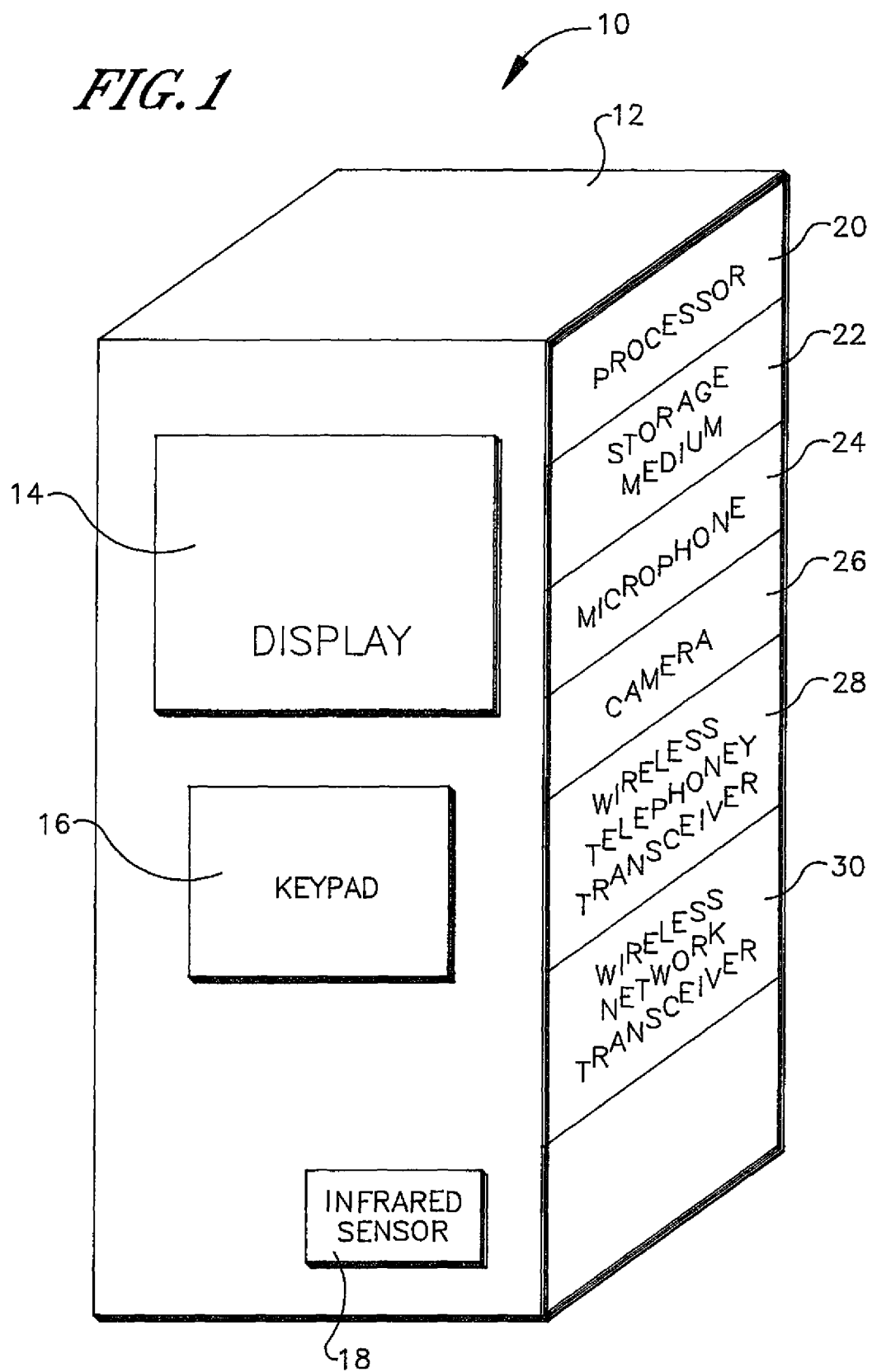

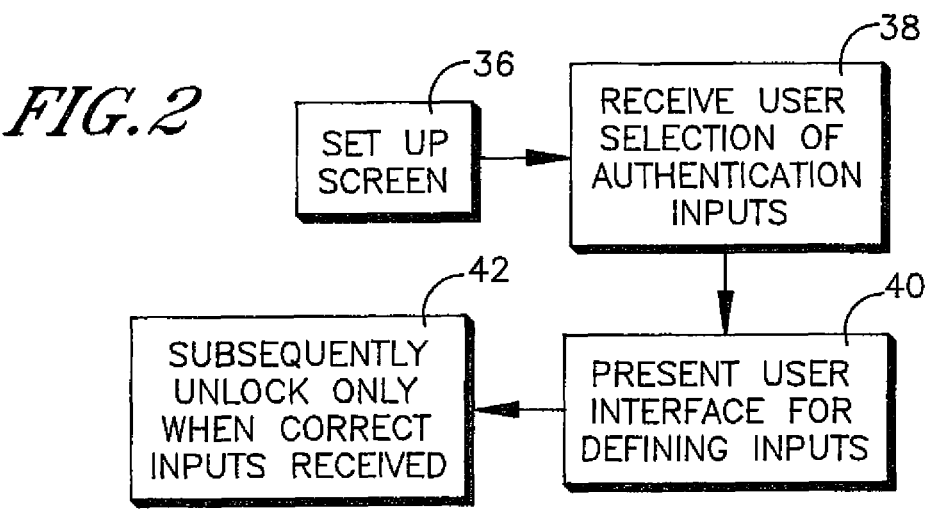
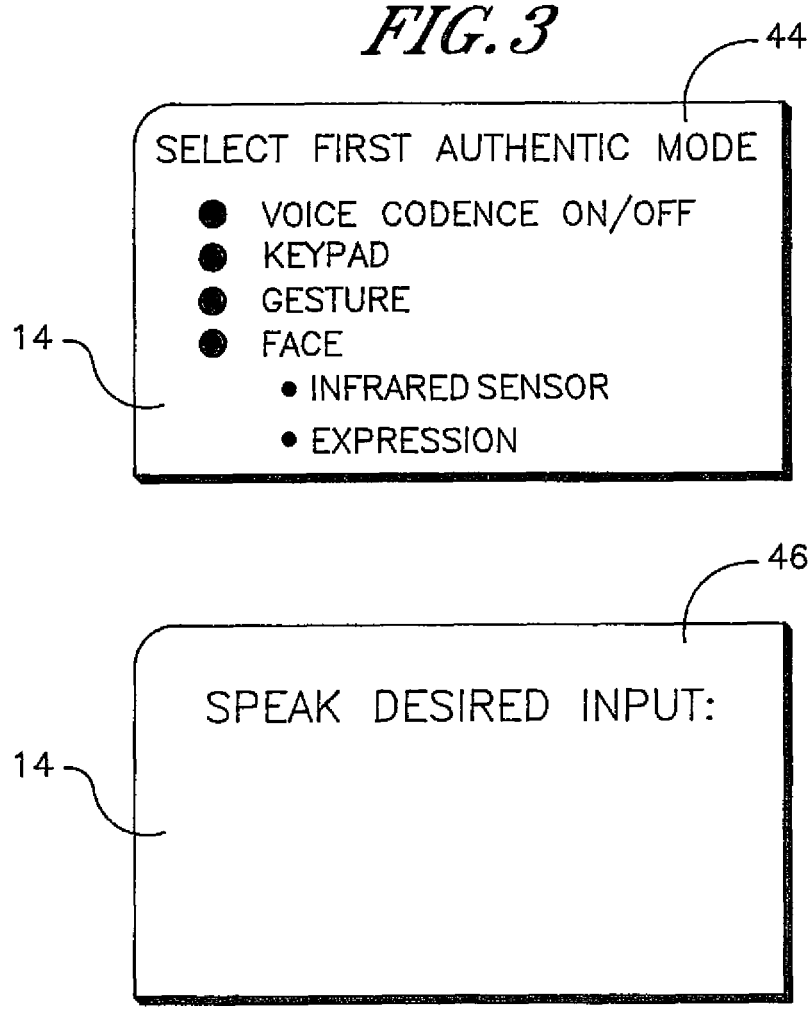

EXAMPLE APPLICATION USER INTERFACE

GESTURE- AND EXPRESSION-BASED AUTHENTICATION

I. FIELD OF THE INVENTION

The present invention relates generally to gesture- and expression-based authentication, sensed either in the visible and/or IR spectrum.

II. BACKGROUND OF THE INVENTION

User input sequences such as passwords are used to unlock computing device behaviors and controls. Examples include unlocking the computing device for operation. Typically, only one input mode is used, e.g., only a text entry or only a biometric input is used to unlock a computer.

As understood herein, face recognition may also be used as a password-type mechanism, but as also understood herein, the use of face recognition can result in an unwanted auto-login in the presence of others among whom the authorized user may not want automatic authorization to occur. Also, a photo of the user may be used by unauthorized people to gain access in the absence of the user.

SUMMARY OF THE INVENTION

Accordingly, a computer includes a processor and a computer readable storage medium accessible to the processor and bearing instructions embodying logic comprising permitting a user to select at least first input mode with associated first input parameter. The first input parameter is face recognition in combination with infrared (IR) sensing, face recognition in combination with a user-defined facial expression, image of a physical gesture established by the user, or a combination thereof. A behavior of the computer is executed only when at least one subsequent input of the first input parameter is received as authentication.

In some examples, the first input parameter is face recognition in combination with infrared (IR) sensing, and the behavior of the computer is executed only responsive to receiving an image matching the face combination and sensing an IR signal at least equal in magnitude to a threshold magnitude. In other examples, the first input parameter is face recognition in combination with a user-defined facial expression, and the behavior of the computer is executed only responsive to receiving an image matching the face combination and also matching the facial expression. In still other examples, the first input parameter is image of a physical gesture established by the user, and the behavior of the computer is executed only responsive to receiving an image matching the image of a physical gesture.

If desired, the instructions can further include permitting the user to select a second input mode with associated second input parameter, with the first input mode being different from the second input mode. The behavior of the computer is executed only when at least one subsequent input of the first input parameter and second input parameter are received in the first and second input modes in an order specified by the user. A user may be allowed to select the behavior.

In another aspect, a method includes presenting, on a computer display, a sequence of user interfaces to permit a user to define at least a first input mode with a respective first input value to establish an authentication protocol to enable a computer behavior. The method executes the computer behavior only when the input value is received. The first input value is face recognition in combination with infrared (IR) sensing, face recognition in combination with a user-defined facial expression, a physical gesture established by the user, or a combination thereof.

In another aspect, a computing device has a processor, a display coupled to the processor, and first and second input devices coupled to the processor that are of different genre from each other. The processor receives a first input mode value from the first input device and a second input mode value from the second input device. The processor then determines whether the first and second values match user-defined values, and only if a match is found, executes a computer behavior. At least one input mode value is established by an image of a gesture, and/or face recognition plus IR sensing satisfying a threshold to ensure a live person is being imaged for authentication, and/or face recognition plus a particular facial expression.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic perspective view of a computing device which can employ present principles;

FIG. 2 is a flow chart of example overall logic;

DETAILED DESCRIPTION OF THE PREFERRED EMBODIMENT

Figure 3:
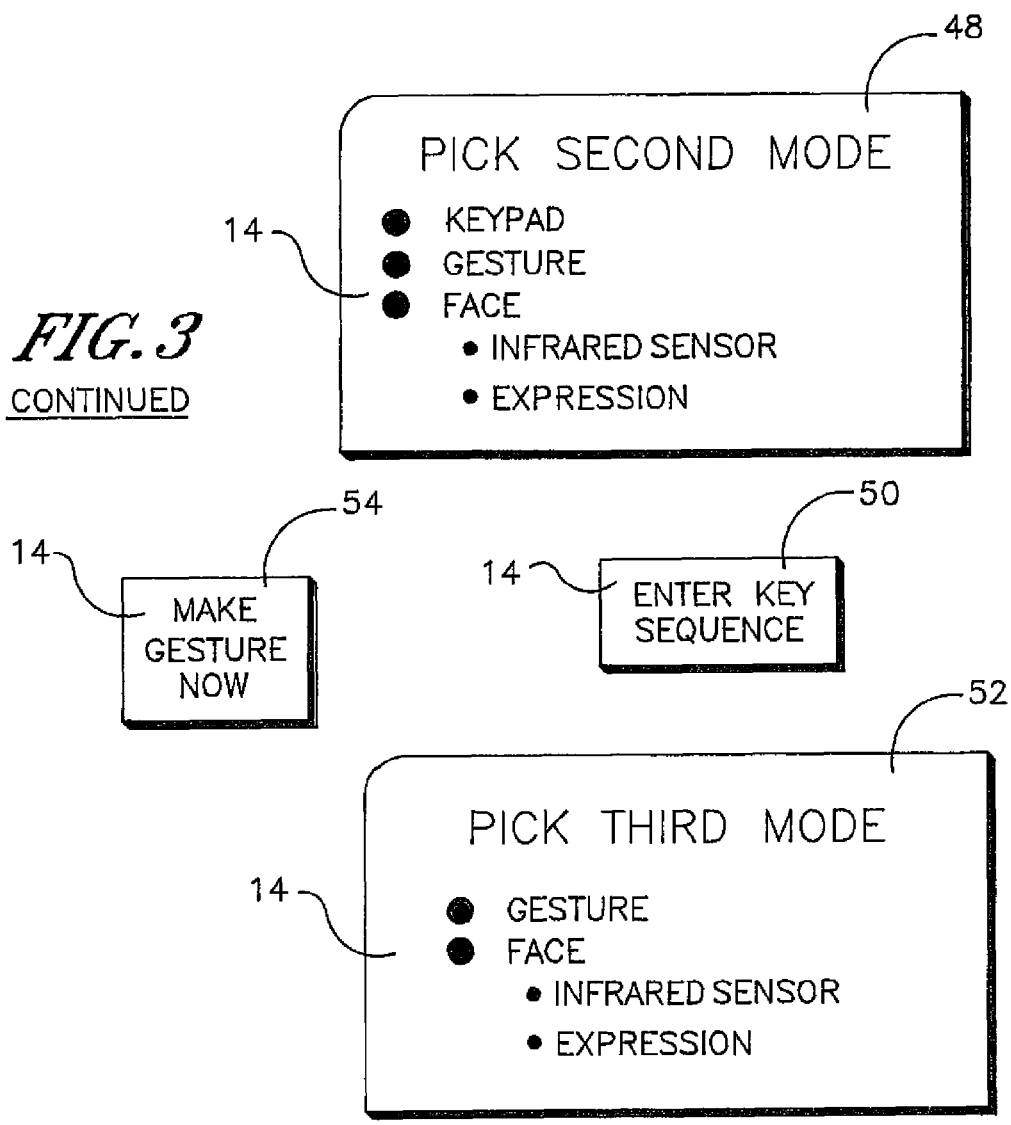
FIG. 3 shows a sequence of screen shots illustrating example user interfaces that may be presented on the computing device to allow a user to define a multi-modal input sequence.

Referring initially to FIG. 1, a device 10 that in the embodiment shown includes a portable lightweight housing 12 has a display 14 such as a touch screen display and a key input device 16 such as a keypad. In some embodiments an infrared (IR) sensor 18 may also be provided on the housing 12.

The device 10 may be implemented in one example embodiment by a smart phone. In other embodiments, the device 10 may be TV, tablet computer, laptop computer, or home automation computer for operating a door, sensing a person's presence to establish setting for lighting and music, etc. Yet again, the device 10 may be an access door for medical hospital applications or for defense industry security access. Indeed, the device 10 may be established by a banking computer such as but not limited to an ATM, transaction kiosk, mobile phone refill station, etc.

The key input device 16 and IR sensor 18 typically provide input signals to one or more processors 20 (only one processor shown) in the housing 12. The processor 20 controls the display 14 to present a demanded image and, when the display 14 is a touch screen display, the processor 20 receives input from the display 14.

The processor 20 can access one or more tangible computer readable storage media 22 to read and write data thereto and to execute logic stored thereon. The medium 22 shown in FIG. 1 may be implemented by disk storage, solid state storage, etc.

FIG. 1 shows various additional sources of input signals to the processor 20 that may be supported on the housing 12. For example, a microphone 24 may provide voice input to the processor 20, while a camera 26 may provide still and/or moving image input to the processor 20.

When the device 10 is implemented as a smart phone a wireless telephony transceiver 28 may be supported on the housing 12 for enabling voice and/or data calls to be made using the device 10. The telephony transceiver 28 may be, without limitation, a global system for mobile communication (GSM) transceiver or code division multiple access (CDMA) transceiver or orthogonal frequency division multiplexing (OFDM) transceiver or satellite phone transceiver or variants thereof.

If desired, a wireless network transceiver 30 may also be provided on the housing 12 to permit network communication using the device 10. The transceiver 30 may be, without limitation, a Bluetooth transceiver, Wi-Fi transceiver, or other appropriate transceiver.

FIG. 2 shows example logic that may be implemented by the processor 20. A set-up screen may be presented on the display 14 at block 36 to enable a user to select to define what specific input modes and values associated therewith are to be used for purposes discussed below. The user's selection to define the modes and values are received at block 38. At block 40, the processor 20 causes the display 14 to present a user interface, an example of which is discussed below, on the display 14 to allow the user to define a multi-mode with corresponding multi-value protocol for enabling a user-selected computer behavior. This behavior is unlocked at block 42 subsequently, and only when the user-defined protocol is input as specified by the user, i.e., only when input modal values match the user-defined values, such that only if a match is found, the computer behavior is unlocked.

FIG. 3 gives an example set of user interface screens that may be presented on the display 14 in the logic of block 40 of FIG. 2. The screen 44 instructs the user to select a first mode. In the example shown, the first mode may be selected from a list that includes voice recognition, potentially with a corresponding cadence, keypad entry, gesture entry, and image entry, potentially with IR and/or expression augmentation discussed further below.

Assuming the user selects voice recognition, the screen 46 may be presented, in which the user is instructed to speak into the microphone 24 the desired value or parameter of the voice mode component, e.g., a word or word string. The parameters may include specific words and/or cadence, timing, and/or more advanced voice recognition parameters such as voice prints, voice-to-text recognition, etc.)

The processor 20 can execute voice recognition software to convert the signal from the microphone to data values that are stored on the medium 22. The values are associated with "voice mode", i.e., with a requirement that the values be received subsequently from the microphone 24.

Because multiple modes may be defined a screen 48 may next be presented on the display 14, instructing the user to select a second mode. Note that the mode selected as the first mode (in this example, voice input) need not appear on the screen 48, but only the remaining available modes. Assuming the user selects "keypad" the screen 50 may appear, instructing the user to input the desired key sequence as corresponding values for the keypad mode. The values are stored on the medium 22 and correlated to the keypad 16.

If desired, the user may be given the opportunity to select more than two modes. Or, the user may have selected "gesture" or "face" initially. In any case, a further screen 52 is presented for selection of a third mode. If the user selects "gesture" at 44, 48, or 52, the UI 54 is presented to instruct the user to make a gesture, for example, a hand wave, hand signal, or other gesture/motion. The image of the gesture is captured by the camera 26 and sent to the processor 20, which stores it on the medium 22.

A screen 56 can be presented responsive to a user selecting: face recognition" from 44, 48, or 52, instructing the user to take a picture of the desired image, e.g., the user's face, which is stored in memory and associated with the camera 26. The image can include still images (pattern, optical character recognition, etc.), video image recognition (which may include movement detection, color pattern analysis, etc.) The user is also given the option of turning IR detection on or off using a toggle selection in the embodiment shown. Moreover, the user may be given the option of electing to have not just recognition of the user's face as an authentication mode, but also recognition of a particular expression on the user's face.

If IR detection is turned on, this means that subsequent authentication is indicated only by both a face recognition match and a sensed IR level by the IR sensor 18 that meets a threshold which is empirically established to indicate the presence of a live human within a few feet of the camera. This is to avoid the above-noted problem with holding a photograph of the user in front of the camera when the user is otherwise absent.

Additionally, when "expression" is selected, the expression on the user's face within, e.g., the next few seconds as imaged by the camera must match the expression in a subsequent image of the user intended to be used for authentication. For example, the user can smile and close one eye as an expression-based face recognition password, and subsequent images of the user's face that are intended for authentication will cause successful authentication only if the subsequent images show the user smiling and closing one eye (or repeating whatever expression was originally established). Other examples of expressions include eyes looking left or right or up or down, a frown, closed eyes, a grimace, a tongue sticking out, etc.

Figure 4:
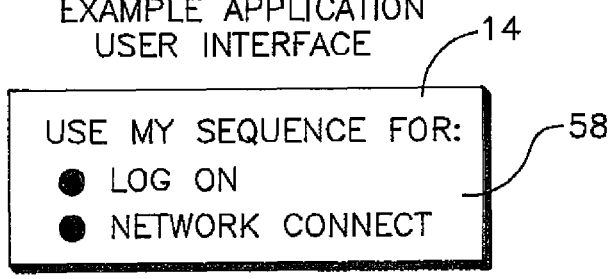
FIG. 4 is an example screen shot of a user interface allowing the user to define which computer behavior is governed by the multi-modal input sequence.

Once the mode sequence and values have been defined by the user, FIG. 4 shows that a screen 58 may be presented to enable the user to define the purpose for which subsequent input of the defined mode sequence and values is to be used. For example, the user may elect to require input of the defined protocol to logon to the computer, or to connect to a network. Other computer behaviors that can be invoked only upon input of the user-defined multi-modal protocol include a transition from a device state with the low power consumption hibernation mode with security device lock engaged to another state with active use of the application software or the network service access functions.

As an example of input sequences that can be used to unlock user-defined computer behaviors, a simple voice (audio) signal from the microphone 24 may first be required and if the input signal matches the user-defined value from block 40 in FIG. 2, the second mode is triggered. If the second mode is image detection, the camera 26 is then activated and input from the camera is tested against the user-defined image value stored at block 40 in FIG. 2. This may be done by activating an embedded camera. The user-defined behavior that is associated with the multi-modal protocol is enabled only when the input mode values match the user-defined values that were established at block 40.

While the particular GESTURE- AND EXPRESSION-BASED AUTHENTICATION is herein shown and described in detail, it is to be understood that the subject matter which is encompassed by the present invention is limited only by the claims.

What is claimed is:

1. A device comprising:
at least one processor;
at least one computer memory with instructions accessible to the processor to configure the processor for:
receiving a first input mode value from a first input device;
receiving a second input mode value;
determining whether the first and second values match user-defined values, and only responsive to a match being found, executing a computer operation, wherein at least the first input mode value is established by an image of a gesture, and the second input mode value is established by face recognition plus IR sensing satisfying a threshold to ensure a live person is being imaged for authentication, and/or the second input mode value being established by face recognition plus a particular facial expression; and
allowing a user to select the computer operation, wherein the computer operation is unlocking the computer for full use thereof.

2. The device of claim 1, wherein at least one input mode value is established by face recognition plus a particular facial expression.

3. The device of claim 1, wherein at least one input mode value is established by a gesture.

4. The device of claim 1, wherein at least one input mode value is established by face recognition plus IR sensing satisfying a threshold to ensure a live person is being imaged for authentication.

5. A device comprising:
at least one non-transitory computer memory with instructions executable by a processor to configure the processor for;
receiving a first input mode value;
receiving a second input mode value;
determining whether the first and second values match user-defined values, and only responsive to a match being found, executing a computer operation; and
allowing a user to define the computer operation to be executed responsive to the match being found, wherein the computer operation defined by the user to be executed responsive to the match being found is transition from a device state of low power consumption mode to active use of software or network service access functions.

6. The device of claim 5,
wherein the computer operation defined by the user to be executed responsive to the match being found is logon.

7. The device of claim 5, wherein the computer operation defined by the user to be executed responsive to the match being found is connect to a network.

* * * * *